United States Patent

[11] 3,552,715

[72] Inventor Aldo Bassi
 Milan, Italy
[21] Appl. No. 773,581
[22] Filed Nov. 5, 1968
[45] Patented Jan. 5, 1971
[73] Assignee Alfa Romeo S. p. A.
 Milan, Italy
 a company of Italy
[32] Priority Dec. 21, 1967
[33] Italy
[31] No. 24,236/67

[54] SOLENOID VALVE
 5 Claims, 3 Drawing Figs.
[52] U.S. Cl. .................................................. 251/139
[51] Int. Cl. ............................................. F16k 31/06
[50] Field of Search ........................................... 251/139

[56] References Cited
UNITED STATES PATENTS
| | | | |
|---|---|---|---|
| 1,223,736 | 4/1917 | Rose ............................ | 251/139X |
| 2,619,116 | 11/1952 | Ralston ....................... | 251/139X |
| 3,324,889 | 6/1967 | Batts ........................... | 251/139X |

*Primary Examiner*—Arnold Rosenthal
*Attorney*—Holman & Stern

ABSTRACT: A solenoid valve which includes a magnetic nucleus, a movable valve element of material sensible to a magnetic field, and an electric circuitry which creates a circulating magnetic flux which involves said magnetic nucleus and said movable element, so that the movable element is internally guided.

PATENTED JAN 5 1971　　　　　　　　　　　　　　3,552,715

INVENTOR
ALDO BASSI

BY Glascock, Downing · Seebold

ATTORNEYS

SOLENOID VALVE

BACKGROUND OF THE INVENTION

This invention relates to a solenoid valve particularly suitable for constituting the actuator of a control system for intermittent flows of fluid.

Numerous types of solenoid valves are known for inserting into fluid pipes which are openable at predetermined time intervals at which fluid discharges take place, the extent of which varies as a function of duration of opening of the solenoid valve, with the duration of the opening being related to the duration of an electrical control signal.

Obviously the shorter the response times on the solenoid valve with respect to the signal, the finer is the control. It is hence important, in a system for controlling the flow of a fluid, to use a solenoid valve having a small response time, which is a characteristic which depends essentially on the weight and dimensions of the movable element included in the solenoid valve. In addition, its hydraulic permeability must be large in order to give a ready passage for the quantity of fluid required.

In the solenoid valves at present available, the movable element slides inside a hollow magnetic nucleus and is guided externally by the lateral walls of this cavity, which forms the duct for the fluid. Normally the movable element consists of a hollow metallic cylinder containing inserted elements of suitable material at the two ends. One element is in the form of a cone and is inserted into and withdrawn from a contraction in the fluid duct in order respectively to impede and permit the passage of the fluid according to whether the electrical windings arranged around the magnetic nucleus are fed or not fed. In said cone or close thereto there are lateral oblique holes which permit the passage of the fluid into a chamber which is placed into communication with said contraction by the withdrawal of the cone from the contraction itself. The other element is placed between the metallic part of the movable element and the magnetic nucleus and has the function of impeding magnetic short circuiting.

The principle disadvantages of these solenoid valves derive from the fact that the guide of the movable element is external to the element itself. This hinders the reduction of the dimensions of the movable element below a certain limit, because of which the response time of the solenoid valve cannot be as short as would be desired. In addition, the large dimensions of the movable element give rise to large external dimensions and hence encumbrance of the solenoid valve, which makes the insertion of the solenoid valve into the most suitable position for its utilization difficult. Any considerable limiting of the dimensions of the movable element is also hindered by the presence of the element in the form of a cone, which being fixed to the hollow cylinder, requires a cylinder of certain dimensions in order to obtain a good reciprocal fixing.

SUMMARY OF THE INVENTION

The above-mentioned mentioned disadvantages are overcome by the solenoid valve according to the invention, which includes a magnetic nucleus containing an elongated cavity open at one end and terminating at the other end in a widened closed chamber, and into which is inserted a projection contained by said closed extremity, said projection being substantially aligned with said cavity and through which is a hole substantially coaxial with said cavity, this hole continuing through said closed extremity so as to finish on the outside of the magnetic nucleus, an element which moves between two extreme positions being guided by said projection so that it slides, said movable element consisting of a tubular part of material sensible to a magnet field and of a cover in a material which forms a closing gasket for said tubular part, said cover closing the hole through said projection when the movable element is in a first extreme position and impeding contact between said tubular part of the movable element and the magnetic nucleus when the movable element is in the second extreme position, resilient means being provided which thrust said movable element into said first extreme position, said tubular part of the movable element containing lateral holes close to said cover which put the hole through said projection into communication with said chamber when the movable element is in said second extreme position, said magnetic nucleus containing lateral holes which put said elongated cavity into communication with said chamber for any position of the movable element, an electric winding being arranged on said magnetic nucleus which creates, if fed, a circulation of magnetic flux in a magnetic circuit which includes said magnetic nucleus and said movable element.

The principal advantages of the present solenoid valve are related to the fact that the movable element is guided internally. In this way, it is possible to limit the dimensions of the movable element in the sense of profiling it better with lesser thicknesses. A dimension in weight is hence obtained with consequent saving of material and smaller time of response to the magnetic opening impulses. For the same weight of movable element a considerable improvement is obtained both in magnetic and hydraulic permeability. The improvements in magnetic permeability derive from the fact that it is possible to give larger dimensions to the narrowest sections traversed by the magnetic flux, with the position of these sections corresponding to the movable element. The improvements in the hydraulic permeability derive from the fact that is it is possible to give larger dimensions to the lateral holes of the movable element even though the dimensions of the movable element itself are reduced.

Other advantages are related to said cover of gasket material which closes the tubular part of the movable element and which serves both as an element to intercept the hydraulic flow (it is in fact such as to close the hole through the said projection and hence close the solenoid valve when the movable element is in its first extreme position) and for separating the tubular part of the tubular element from the magnetic nucleus (when the movable element is in the other of its extreme positions) so as to impede a magnetic short circuit which would provoke hysteresis and late responses due to an excess of magnetic flux. The same cover carries out both functions, while in the past two distinct gasket elements were needed.

In total, a lesser time of response of the solenoid valve to the signal for delivering a certain flow is obtained, with a smaller winding and a lesser absorption of current, that is, a greater facility in realizing the electrical or electronic signal control device. All this leads to obvious advantages of lightness of weight and also of simple and economic manufacture.

BRIEF DESCRIPTION OF THE DRAWINGS

A preferred embodiment of the solenoid valve according to the invention will now be described with reference to the accompanying drawing in which.

DETAILED DESCRIPTION OF THE INVENTION

Figure 1:
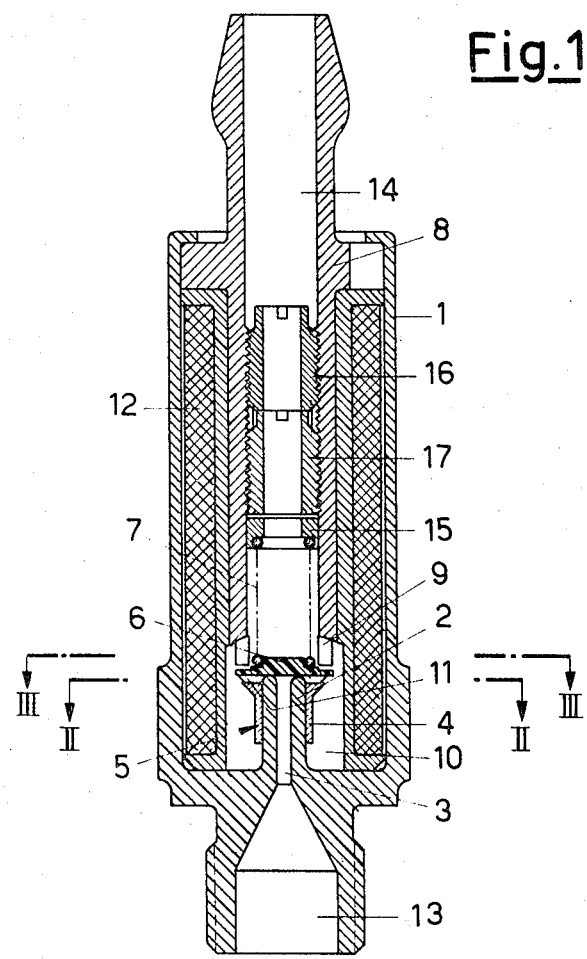
FIG. 1 is a longitudinal sectional view of a solenoid valve according to said preferred embodiment.

Referring particularly to FIG. 1, the solenoid valve includes a magnetic nucleus consisting of two elements arranged one inside the other. An external element 1 consists of an elongated block containing an internal cavity open at one end and in which is inserted an internal element 8 which consists of an elongated block through which there is a hole 14.

The internal element 8 is partially inserted in the cavity of the external element so that between the internal element and the closed extremity of the external element there is a widened chamber 10. The closed extremity of the external element contains a cylindrical axial projection 2 pointing towards the inside of the solenoid valve and through which there is an axial hole 3 which continues through said closed extremity of the element 1 before enlarging itself into a hole 13 which emerges on the outside of the solenoid valve. The cylindrical projection 2 acts as a guide for a movable element 5 in the form of an overturned bowl consisting of a tubular metallic part 4 and a cover 6 of plastic material which closes said tubular part 4. The movable element 5 can oscillate between two extreme positions. In a first extreme position (that of FIG. 1) the cover 6 rests on the extremity of the projection 2 so as to close the hole 3. In the second extreme position, the cover 6 rests on the internal extremity of the element 8 so as to impede any contact between the part of the movable element 5 and the internal element 8 of the magnetic nucleus.

Figure 2:
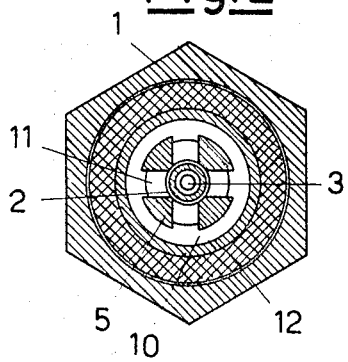
FIG. 2 is a sectional view of the solenoid valve through the line II–II of FIG. 1.
Figure 3:
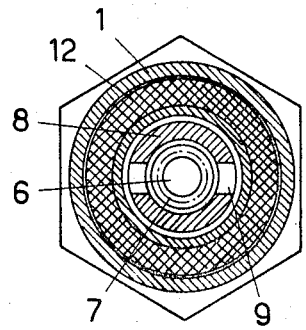
FIG. 3 is a sectional view of the solenoid valve through the line III–III of FIG. 1.

The movable element 5 further contains some lateral holes 11 (FIG. 2) arranged so as to put the internal cavity of said tubular part and hence the hole 3 in communication with the chamber 10 when the movable element is in said second extreme position and so as to be closed by the said projection 2 when the movable element is in said first extreme position (FIG. 1).

The lower extremity of the internal element 8 contains lateral holes 9, with said holes permitting communication with said holes permitting communication between the hole 14 and the chamber 10 when the movable element is in said second extreme position and so as to be closed by the said projection 2 when the movable element is in said second extreme position.

The movable element is thrust into the position of FIG. 1 by a spring 7 arranged between the cap 6 of the movable element and a block 15 the position of which in the chamber 14 is adjusted by a nut 17 and a locking nut 16 which screw into the said cavity 14.

The movement of the movable element from the position of FIG. 1 is controlled by sending an electrical impulse to electrical windings 12 arranged between the external walls of the internal element 8 and the internal wall of the external element 1. Under these conditions there is a passage of magnetic flux in the circuit including the external element 1, the metallic part of the movable element 5 and the internal element 8.

This magnetic flux provokes the raising of the movable element until it carries the cover 6 into contact with the lower extremity of the internal element 8. As the holes 11 and the hole 13 are open and as the solenoid valve is inserted in a fluid carrying pipe, there is a passage of fluid from the entry port 14 to the exit port 13 through the holes 9 of the internal element 8, the chamber 10, the holes 11 of the movable element and the hole 3 of the projection 2. The presence of the cover 6 of plastic material impedes the contact between the metallic part of the movable element 5 and the magnet nucleus, thus avoiding magnetic short circuiting.

When the impulse to the inlet terminals of the windings 12 ceases, the spring 7 thrusts the movable element back into the position of FIG. 1. The holes 11 of the movable element and the hole 3 of the projection 2 are closed and the passage of fluid is thus blocked, and will start again on the arrival of a new control impulse to the windings 12.

I claim:

1. A solenoid valve which includes a magnetic nucleus containing an elongated cavity open at one end and terminating at the other end in a widened closed chamber, in which is inserted a projection contained by said closed extremity, said projection being substantially aligned with said cavity and through which there is a hole substantially coaxial with said cavity, this hole continuing through said closed extremity so as to emerge on the outside of the magnetic nucleus, a movable element being guided by said projection so that it slides between two extreme positions, said movable element consisting of a tubular part of a material, sensitive to a magnetic field and of a cover of gasket material for closing said tubular part, said cover closing the hole through the said projection when the movable element is in a first extreme position and impeding contact between said tubular part of the movable element and the magnetic nucleus when the movable element is in the second extreme position, resilient means for thrusting said movable element into said first extreme position being provided, said tubular part of the movable element containing lateral holes close to said cover which out the hole through said projection into communication with said chamber when the movable element is in said second extreme position, said magnetic nucleus containing passages which put said elongated cavity into communication with said chamber at any position of the movable element, electrical windings being arranged on said magnetic nucleus which create, if fed, a circulation of magnetic flux in a magnetic circuit including said magnetic nucleus and said movable element.

2. The solenoid valve as claimed in claim 1, in which said magnetic nucleus consists of an external elongated element containing a cavity open at one end, said projection projecting from said external element at the closed end, and of an internal elongated element through which there is a hole substantially coaxial with the cavity of said external element, said internal element being partially inserted into said external element so that between said elements is formed said widened chamber, said windings being arranged between the external wall of the internal element and the internal wall of the external element.

3. The solenoid valve as claimed in claim 1 in which said projection is of cylindrical development.

4. The solenoid valve as claimed in claim 1, in which said movable element is in the form of a bowl whose bottom consists of said cover.

5. The solenoid valve as claimed in claim 4, in which said cover is of plastic material.